United States Patent Office.

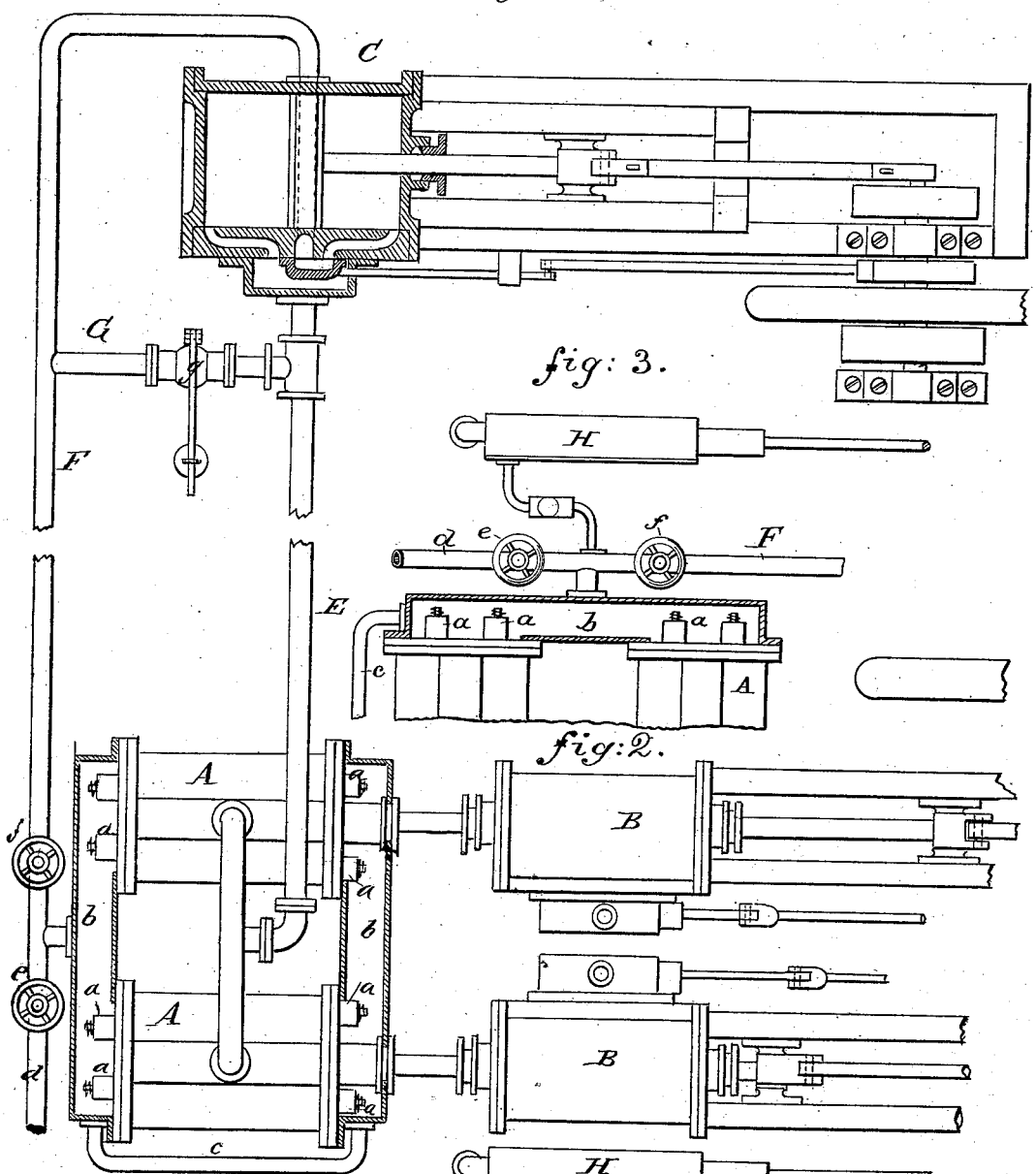

ALFRED D. F. FARLEY, OF LEAVENWORTH, KANSAS.

TRANSMITTING POWER BY COMPRESSED AIR.

SPECIFICATION forming part of Letters Patent No. 268,210, dated November 28, 1882.

Application filed December 23, 1881. (No model.)

*To all whom it may concern:*

Be it known that I, ALFRED D. F. FARLEY, of Leavenworth, in the county of Leavenworth and State of Kansas, have invented new and useful Improvements in Transmitting Power by Compressed Air or other Fluids, of which the following is a full, clear, and exact description.

The object of my invention is to transmit power by compressed air or other fluids in a manner to insure the greatest economy of initial power and to overcome the disadvantages heretofore experienced in using compressed air. In my improved apparatus the fluid has continuous circuit, first from the compressor to the distant engine, and from thence back to the compressor, as hereinafter described and claimed.

Reference is to be had to the accompanying drawings, forming a part of this specification, in which similar letters of reference indicate corresponding parts in the several figures.

Figure 1 is a sectional plan view representing the engine to be operated. Fig. 2 is a sectional plan view showing the compressor and connections, and Fig. 3 is a detail plan, partly in section, showing the connection of the auxiliary air-pump with the return-pipe.

A A are the cylinders of a duplex air-compressor, and B B are the steam-cylinders. This compressor may be of any ordinary construction, and operated by steam or water power. As shown, the inlet-valves $a$ are in the cylinder-heads, and are covered by hoods $b$, that connect by a pipe, $c$, and a pipe, $d$, provided with a hand-valve, $e$, is connected with one hood for inlet of atmospheric air to the pumps.

C is the distant engine, to be operated by compressed air.

E is a pipe from the compressor A to the valve-chest of engine C.

F is the return-pipe from the engine to the inlet-pipe $d$ of the compressor.

$f$ is a hand-valve in pipe F.

G is a cross-pipe connecting the supply and return pipes E F, and provided with a valve, $g$, weighted in the manner of a safety-valve, to retain it closed.

H is a small auxiliary air-pump, having its outlet-pipe connected to pipe F, for supplying air to take the place of that wasted by leakage. This pump may be located at the compressor and operated by the same power, or at the distant engine and operated thereby.

The operation is as follows: The valve $g$ being weighted at sixty pounds, valve $e$ open and valve $f$ closed, and the compressor set in motion, air is compressed in the pipe E. When the pressure exceeds sixty pounds valve $g$ opens and the air enters pipe F, in which it is compressed. For every pound of pressure in pipe F there will be a corresponding rise in pipe E. Consequently when a pressure of sixty pounds is obtained in the return-pipe there will be one hundred and twenty pounds in the supply-pipe. When these pressures are obtained valve $e$ is to be closed and valve $f$ opened, which connects the inlet-valve of the compressor with the return-pipe, and the compressor consequently receives air at sixty pounds pressure and compresses it still further to any desired extent. Supposing that a working-pressure of sixty pounds is required, the piston of the compressor must travel half the stroke to obtain it, while if air at natural pressure were used the piston would have to travel four-fifths of its stroke to obtain it. At the engine there is a pressure of sixty pounds on one side of the piston and one hundred and twenty pounds on the other, when working at full pressure without expansion. If the cut-off is at half-stroke, with the pressures named, the air is fully expanded when the stroke is completed, and thus gives back all the power applied to it, less loss by heat and friction. The higher the tension of the air in the pipes E F the shorter the space required for full expansion. Thus if the air in pipe E has a pressure of one hundred and twenty pounds per square inch, an effective pressure of sixty pounds will be obtained when the piston of the compressor has traveled one-third the stroke, and the same space will be required for full expansion if the motor-cylinder be of the same size. The pressure-valve $g$ acts as a regulator, which allows surplus air over what is used to pass to the return-pipe, so that while the quantity of air used by the engine may be variable the compressor may act constantly and uniformly.

There is a great advantage in the return of the air to the compressor, from the fact that atmospheric air is not being continually taken into the compressor, and the moisture is thus excluded. The air returns in a cool and dry condition, and if the pipes are covered with non-conducting material it will be restored in compressed state at a temperature not exceeding the surrounding air. There is a further advantage that there will be little or no trouble from the formation of ice in using the air expansively.

Having thus described my invention, I claim as new and desire to secure by Letters Patent—

1. In an apparatus for transmitting power by compressed fluids, the combination, with the cylinders of a compressor and the distant engine, of a supply and return pipe connected together between the compressor and engine by a pipe provided with a safety-valve, substantially as and for the purpose set forth.

2. In an apparatus for transmitting power by compressed fluids, the combination, with the cylinders A A of a compressor and distant engine C, of the supply-pipe E, the return-pipe F, provided with the valve $f$, and the connecting-pipe G, provided with the weighted valve $g$, substantially as and for the purpose set forth.

3. The regulating-valve $g$, combined with the supply and return pipes of the air-compressor and engine, substantially as shown and described.

4. The combination, with the return-pipe F, provided with the valve $f$, and the air-inlet pipe $d$, provided with the valve $e$, of the auxiliary air-pump H, connected to the said pipes between the valves, substantially as and for the purpose set forth.

A. D. F. FARLEY.

Witnesses:
GEO. D. WALKER,
C. SEDGWICK.